Sept. 13, 1932.    M. WAIDE    1,876,806
OPTICAL SYSTEM FOR PRODUCING PHOTOGRAPHS AND
PROJECTING THE SAME IN NATURAL COLORS
Filed April 26, 1929
Monochromatic images formed
by dispersion to avoid loss of
light by use of filters as are necessary
in reflective
separation or division
of light
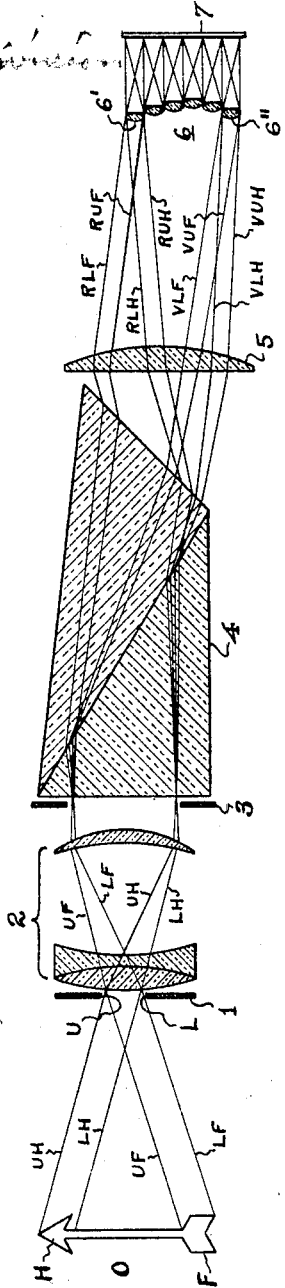
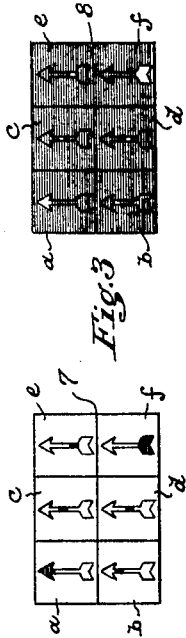
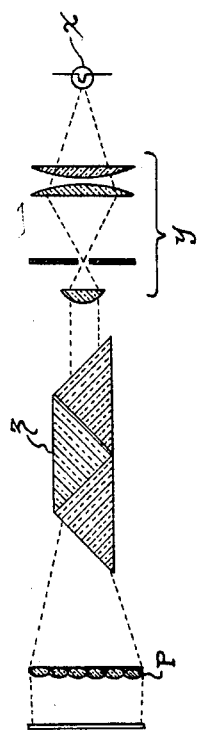
INVENTOR.
Merrill Waide,
BY
George D. Richards
ATTORNEY.

Patented Sept. 13, 1932

1,876,806

UNITED STATES PATENT OFFICE

MERRILL WAIDE, OF NEWARK, NEW JERSEY, ASSIGNOR TO NATURAL-COLOR, INC., OF NEW YORK, N. Y., A CORPORATION OF DELAWARE

OPTICAL SYSTEM FOR PRODUCING PHOTOGRAPHS AND PROJECTING THE SAME IN NATURAL COLORS

Application filed April 26, 1929. Serial No. 358,178.

This invention relates to a novel optical system for producing photographs forming a series of monochrome records of the colors of the object photographed, and for projecting said photographs to effect a reproduction of the object in its natural colors, and for either simple stereopticon projection or moving picture projection.

This invention has for one object to provide an optical system and method whereby all the light from an object falling upon the optical system will be so directed and dispersed as to form, on a suitably sensitized plate or film, a photographic record adapted to define both the form and the colors of said object, but without necessity for employing color filters or screens; thus avoiding loss of brilliancy and definition by reason of diminution of the light due to absorption of part thereof by interposed color filters or screens, both in the taking of the photographic record and conversely when the optical system is employed to transmit the illuminated record as a projected picture on an exhibiting screen.

Another object is to provide an optical system and method for the purposes above set forth which avoids all necessity of employing minute refractive elements in or upon the sensitized plate or film, and consequently being adapted to produce negatives of ordinary physical structure readily adapted to permit the usual contact printing of positives therefrom; and, furthermore, negatives and positives which are readily adapted for use in known forms of cameras and projecting apparatus.

A further object of this invention is to provide a novel optical system and method for the purposes described whereby the photographing and projecting of an object of white or other compound color, need not be dependent upon a synthetic simulation of such color by a mixture of red, green and blue-violet or other selected colors. For example, in a process employing three color filters of red, green and blue-violet respectively, a white object is shown by a mixing of red, green and blue-violet light on the theory of so exciting the three optical sensations as to produce in the consciousness of the observer the compound color white; whereas, by the method of this invention, a white object would be photographed or projected, as the case may be, by utilizing all of the light, chromatically speaking, of the white light source, i. e. all of the white light of the object in the photographic process, and all of the white light source in the projecting process, with a consequent practical gain in illumination and brilliancy.

The above mentioned and other objects and advantages, as will hereafter appear in the following detailed description of this invention, are attained by a novel optical system including essentially an image forming means, a light dispersing means, and a panchromatic sensitive emulsion for the photographic negative.

An illustrative embodiment of this invention is shown in the accompanying drawing, in which:—

Fig. 1 is a schematic view showing the novel optical system functioning in accordance with the principles of this invention; Fig. 2 is a monochrome negative on which are found a series of images producing color value records of the color or colors of a variegated object photographed by the novel optical system of this invention; and Fig. 3 is a monochrome positive printed from said negative for use in connection with projection of an image of said object in its natural color or colors. Fig. 4 is an object of variegated color corresponding to the color record negative and positive of Figs. 2 and 3. Fig. 5 illustrates a method of projection by supplying dispersed light to the color recording plate or film.

Referring to Fig. 1, the object to be photographed is the arrow O, the head of which is indicated by the reference letter H, and the feather of which is indicated by the reference letter F. The reference character 1 indicates an apertured diaphragm, 2 a compund converging lens, 3 a diaphragm, 4 a dispersive prism, 5 a converging lens, and 6 a group of collecting lenses including lenses 6′ and 6″, and 7 a negative plate or film carrying a suitable panchromatic emulsion.

While I have designated the dispersive means 4 as a "prism", such term is not to be considered as exclusive of forms of dispersive means which, technically, may be otherwise designated. For example, it is intended that the external and internal surfaces of the prism 4 shall be available for the inclusion of correcting means and for refraction of oblique rays as in image formation. If, for these reasons, such surfaces are desired to be curved, dispersive means could be technically designated a hyperchromatic lens of small refracting power for the green rays; I therefore intend it to be understood that a dispersive means of the latter or similar form is equivalent, for the purposes of this invention, to the dispersive prism shown in the drawing; and also that a succession of several component parts of various dispersive materials within the dispersive means shall be understood as schematically included in Fig. 1 by the two parts shown.

In Fig. 1, the rays of light proceeding from the object, so as to fall upon the optical system comprising the elements above indicated, are so lettered and shown as to trace their paths in dispersing and forming record images on the negative plate or film 7. The reference letters U and L respectively indicate rays passing through the upper and lower extremities of the aperture of the diaphragm 1. The letter R indicates the red rays emanating from the dispersive prism and as separated thereby from the light of the object O falling on the optical system, and in like manner V indicates the violet rays. In order to simplify the illustration and description of the novel optical system of this invention, I have shown and will describe the dispersion of the extreme spectrum colors red and violet, although it must be understood, that the system may, and in practice would, include one or more intermediate spectrum colors, such as green, or yellow and green, or orange, yellow, green and blue; and in such case additional lenses are added to the group 6 of collecting lenses in proper focal length and position to correspond to such additional colors with respect to which a record image is desired to be produced on the negative film 7. In the schematic representation of the novel optical system and method, and to further simplify explanation thereof, only groups of light rays falling on the system from the head H and feather F of the object O are shown, although it will be understood that light rays from all parts of the object will traverse the optical system and will be dispersed and recorded in a manner exactly similar to that of the head and feather light rays herein especially illustration and described.

Tracing the light rays which traverse the optical system as shown in Fig. 1, rays proceeding from the head H of the object O pass through the aperture of the diaphragm 1 and thence through the lens group 2 so as to be directed upon the dispersive prism 4 at the face of which is a diaphragm 3. The ray U H proceeds from the head H so as to pass the upper extremity of the aperture of the diaphragm 1, while the ray L H proceeds from the head H so as to pass the lower extremity of the aperture of the diaphragm 1. In like manner, the ray U F proceeds from the feather F so as to pass the upper extremity of the aperture of the diaphragm 1, while the ray L F proceeds from the feather F so as to pass the lower extremity of the aperture of the diaphragm 1.

The dispersive prism 4 is a direct vision prism so constructed by interrelated component prisms that rays of the mid-part of the visual spectrum, e. g. green rays, will be subject to the least deviation as they emerge therefrom, whereas the rays of the extreme parts of the visual spectrum, i. e. the red and violet rays are refracted in approximately equal amounts by dispersion.

The rays UH, LH, and UF, LF, as directed upon the prism 4 by the compound converging lens 2, will form an aerial image near or in the prism structure, and by the dispersive effects of the latter will be broken up into color rays of the visual spectrum, whereby the red color component of the rays UH and LH become, respectively, the rays RUH and RLH, and the red color component of the rays UF and LF become, respectively, the rays RUF and RLF; and in like manner, the violet color component of the rays UH and LH become, respectively, the rays VUH and VLH, while the violet color component of the rays UF and LF become, respectively, the rays VUF and VLF. It will thus be seen that the rays of light proceeding from the object and traversing the aperture of the diaphragm 1 are dispersed or separated into rays of the color components thereof and thereupon such component colors rays are refracted in separate paths to separately fall on the converging lens 5.

The converging lens 5 so directs the several sets of dispersed color rays as to form images of the aperture of the diaphragm 1 in the approximate plane of the group 6 of small collecting lenses. For example, each of the lenses 6′ and 6″ are of such focal length and are so placed that it will, together with the converging lens 5, form an image of the object on a predetermined area of the emulsion on the negative or film 7, such image having the color value of the dispersed rays of light within the path of which it is placed. As a consequence of this a plurality of different monochrome images corresponding to the color values of the dispersed light will form on the sensitized plate or film 7. Since each of the collecting lenses is placed in the path of rays selected as to color, it follows that a large number of such lenses, corresponding to spectrum color variation, placed side by side would each produce an image by light of nearly one hue or color of the visual spectrum, while a lesser number of lenses, e. g. two or three, would form images of one-half or one-third of the colors of the visual spectrum respectively. Since the rays of various colors will not come to focus in an absolute common plane, each of the collecting lenses is preferably placed at the approximate focus of rays of the particular colors which fall upon it.

Each of the collecting lenses, together with the lens 5 forms a combination in which the sensitized plate or film 7 and dispersive prism 4 are in conjugate focal planes, consequently, since dispersion occurs near the plane of the aerial image near or within the dispersive prism 4, the dispersed rays of various colors passing through a given collecting lens will be refocused at the conjugate plane of the sensitized negative plate or film 7. Each lens in the group 6 may be assisted, if desired, by a prismatic factor operating oppositely to the action of the dispersive prism 4, whereby the recomposition of the dispersed light received by each lens will be more easily effected.

It will be obvious that by using a plurality of collecting lenses, properly focused and positioned with respect to selected color rays, e. g. red, orange, yellow, green, blue and violet, a monochrome negative providing six individual color recording images corresponding to the colors named will be produced. A negative providing such series of color recording images is shown in Fig. 2 of the drawing. It will be understood that negatives bearing a lesser number of color recording images of fewer selected colors may be similarly produced by arranging a corresponding number of collecting lenses in the path of the selected color rays, such for example as red, green and blue-violet.

The monochrome negative plate or film 7, as shown in Fig. 2, illustrates a series of six color recording images of a variegated object, such as the arrow O' shown in Fig. 4, in which the barb or head is red, the shaft provided with bands of orange, yellow, green and blue, and the feather is violet. The section $a$ contains the image with a negative color record of the red barb or head, the section $b$ contains the image with a negative color record of the orange band of the shaft, $c$ of the yellow band of the shaft, $d$ the green band of the shaft, $e$ the blue band of the shaft, and $f$ the violet of the feather. Fig. 3 illustrates a positive plate or film 8 bearing images having corresponding positive color records produced by contact printing from the negative plate or film 7.

It will be understood that the aperture of the diaphragm 1 and the angles of the direct vision prism 4 will be so adjusted that light rays passing through the latter will be as nearly equally dispersed as possible and so as to obtain substantial separation of the desired color recording images on the negative plate or film 7. It will also be understood that the converging lens 5 and the collecting lenses will be so shaped as to correct any distortion which may result from unequal dispersion. If desired, two lenses may be employed in lieu of the single lens 5 so as to permit of making various corrections and to narrow the light beams. In fact, while the optical system and method of this invention has been described merely as to its characteristics and main essential elements, it is not to be considered by reason thereof that the invention is restricted to the use of the latter elements only, since any optical elements calculated to correct various abberations found to occur in the system may also be employed within the skill of the art.

The dispersion may be simultaneously effected in more than one axis. For example, with the system herein shown and described, the method illustrated in Fig. 1 might be that carried on in one plane while a similar treatment of the light might be simultaneously effected in another plane cutting the first plane at a right angle, and both planes containing the principal optical axis of the system.

The novel optical system or method of this invention may be used for projecting an image of an object in its natural colors on a screen, as in either stereopticon or in moving picture projecting, and in such case color recording images on a plate or film are illuminated by dispersed light, and then optically superimposed on the exhibition screen. In Fig. 5 I have shown an arrangement for illuminating the color recording images of a plate or film by directing white light from a source $x$ through a suitable lens group $y$ so that the same falls upon a dispersive prism $z$, whereupon the dispersed light is directed by a group of collecting lenses or prisms P so that light of a proper corresponding color will illuminate the respective color recording images on the plate or film, whereupon any suitable optical means may be employed to superimpose the thus illuminated color recording images on the exhibiting screen.

The color recording images obtained by the photographic method of this invention, may also be used as a projectiing media operating in conjunction with means of color illumination other than that obtained by dispersed light.

As many changes could be made and many apparently widely different embodiments of this invention could be made within the scope of the appended claims, it is intended that all matter shown in the accompanying drawing and contained in the above description shall be interpreted as illustrative and not in a limiting sense.

I claim:

1. An optical system for photographically recording form and color of an object, comprising an objective to receive all the light from said object, means to disperse the light traversing said objective, a series of collecting lenses, and means to direct dispersed light from said dispersing means upon said collecting lenses without appreciable deviation, said collecting lenses being spaced at varying distances from said light directing means so that each of said lenses lies in the approximate focus of rays of the particular colors which fall upon the same whereby images are formed on a color sensitive emulsion corresponding to colors of the dispersed light.

2. An optical system for photographically recording form and color of an object, comprising an objective for receiving light reflected from said object, prism means arranged to disperse the light traversing said objective, an apertured diaphragm inserted between said objective and said prism means for limiting the light falling upon the latter, a converging lens arranged for converging the light traversing said prism means so as to form a plurality of different color images at varying distances from said converging lens corresponding to the focuses of the several colors, and a plurality of collecting lenses, each respective collecting lens being positioned substantially in the plane of a respective one of said color images.

In testimony, that I claim the invention set forth above I have hereunto set my hand this 23rd day of April, 1929.

MERRILL WAIDE.